Oct. 30, 1962     D. C. GERNES     3,061,411
IMPROVEMENT IN A PROCESS FOR PRODUCING SYNTHETIC CRYOLITE
Filed Feb. 1, 1960
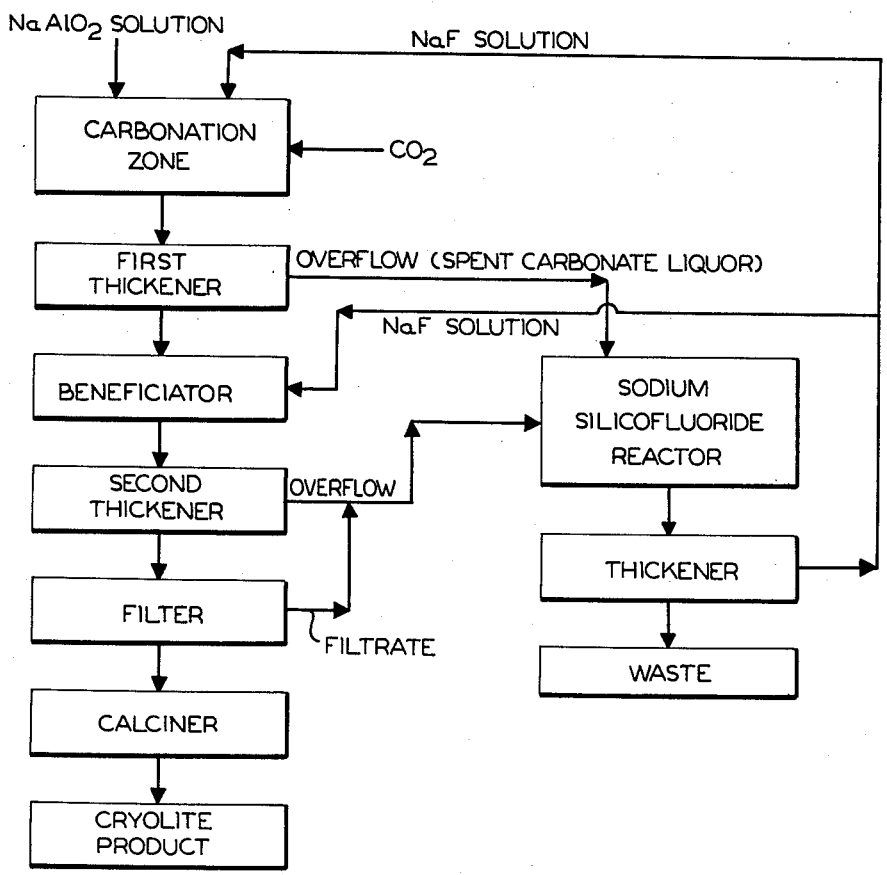
INVENTOR
DONALD C. GERNES
BY *James E. Toomey*
ATTORNEY

3,061,411
IMPROVEMENT IN A PROCESS FOR PRODUCING SYNTHETIC CRYOLITE

Donald C. Gernes, Los Gatos, Calif., assignor to Kaiser Aluminum & Chemical Corporation, Oakland, Calif., a corporation of Delaware
Filed Feb. 1, 1960, Ser. No. 5,878
6 Claims. (Cl. 23—88)

This invention relates generally to the production of synthetic cryolite. More particularly, it relates to the improvement of the quality of synthetic cryolite product which is deficient in fluorine such as that produced by the carbonation of aqueous solutions containing sodium aluminate and sodium fluoride.

In the prior art there have been proposed many methods for the synthesis of cryolite, and processes also have been proposed for the recovery of cryolite values from waste gases from aluminum reduction cells or from used pot linings which have been employed in electrolytic aluminum reduction cells. One of the most widely used processes for the synthesis of cryolite or for the recovery of cryolite values from waste sources involves the precipitation of the cryolite product by the carbonation of an aqueous solution containing sodium aluminate and sodium fluoride, such as is theoretically illustrated by the following equation:

(1)
$$6NaF + NaAlO_2 + 4CO_2 + 2H_2O = Na_3AlF_6 + 4NaHCO_3$$

For the synthesis of cryolite the sodium fluoride component may be obtained by reacting hydrofluoric acid (HF), commonly obtained from fluorspar ($CaF_2$), with a sodium compound such as caustic soda or sodium carbonate. Or, the sodium fluoride can be obtained by reacting a fluosilicate compound with a sodium compound.

As shown in Equation 1 above, sodium aluminate is one of the reactants in producing synthetic cryolite. The sodium aluminate may be obtained from any suitable source material. One suitable material is aqueous sodium aluminate solution obtained in the well-known Bayer process for making alumina. A sodium aluminate solution which is suitable for use in producing synthetic cryolite is one produced by dissolving scrap aluminum in a caustic soda solution, or a suitable sodium aluminate solution is also obtained by reacting alumina or alumina hydrate with caustic soda or soda ash to form sodium aluminate.

Also, a useful starting aluminate material may be obtained by leaching with caustic soda solution, used carbonaceous pot linings recovered from electrolytic reduction cells, whereby there is recovered an aqueous solution containing sodium aluminate and also some sodium fluoride. The proportions of sodium fluoride and sodium aluminate can be varied, and these components can be obtained in the proportion desired for cryolite production.

An efficacious method of producing cryolite is that disclosed by Alva C. Byrns in application Serial No. 598,137, filed July 16, 1956, now Patent No. 2,994,582, wherein, in producing sodium fluoride, a silicofluoride material, such as sodium silicofluoride or fluosilicic acid, is continuously introduced into a reaction zone to which there is also continuously added a stream of dilute aqueous solution of alkali-metal carbonate. The two admixed components react to form sodium fluoride and silica. Under the proper reaction conditions, the fluoride remains in solution and the silica precipitates. The precipitated silica is easily separated from the solution by thickening followed by filtration. The sodium fluoride solution obtained is then admixed in another reaction zone with an aqueous solution of sodium aluminate and sodium hydroxide to provide a substantially stoichiometric ratio of aluminum to fluorine, based on cryolite. The solution admixture is partially neutralized with carbon dioxide gas to precipitate cryolite.

In producing synthetic cryolite according to Equation 1 above, sodium fluoride solution and sodium aluminate solution are admixed in proportion to provide an approximately stoichiometric fluorine-to-aluminum weight ratio based on cryolite. The admixed liquor, containing in aqueous solution sodium aluminate and sodium fluoride, is then passed to a carbonator or carbonation zone and carbonated by addition thereto of carbon dioxide gas. The gas employed may consist essentially of carbon dioxide or a gas containing carbon dioxide, such as flue gas or exhaust gases issuing from a zone wherein the cryolite product is being calcined. Preferably, the carbonating gas contains at least 10% $CO_2$. The carbonation step may be carried on batchwise or preferably in a continuous manner. As carbon dioxide is added to the aluminate-fluoride liquor, cryolite begins to precipitate at a pH of about 12.2 and addition of carbon dioxide is continued until the pH is reduced to about 8.5 to 10.0. Carbonation may be carried out at normal or room temperatures or at increased temperatures, and, for example, by bubbling the gas through the solution being treated in any desired manner. Carbonation at an increased temperature, e.g., 30 to 70° C., gives advantageous results both as to the crystalline character and settling and filtering characteristics of the cryolite product. The precipitation efficiency of the carbonation stage based on fluorine available in the solution being treated is over 90% and in preferred operations it is as high as 95% when using an F to Al weight ratio of 4.23. The retention time in the carbonator or carbonation zone is preferably about one hour to about 2.5 hours, especially when operating at temperatures of from 30 to 70° C., but the retention time is varied by varying the rate of introduction of carbon dioxide. If desired, cryolite seed crystals may be provided in the carbonation zone, and these can be obtained from any suitable source, for example, cryolite previously precipitated by the synthetic cryolite process.

The cryolite precipitate which is obtained may be separated from the residual liquor by thickening in a suitable thickener, and then filtering in any suitable filtering apparatus. Alternatively, it may be separated by settling and decantation, centrifuging or other desired means, or any combination of the mentioned means. The cryolite product is then dried and calcined at a temperature ranging from about 500 to 700° C. Calcination may be effected in any desired apparatus, for example, a muffle furnace, a mechanically rabbled furnace, or a multi-hearth furnace.

The quality of the product produced by the carbonation of an aqueous solution containing sodium aluminate and sodium fluoride is dependent mainly on the relative proportions and total percentage of the three major constituents, fluorine, sodium and aluminum. The quality of the product decreases when the fluorine content is deficient and when there is excess sodium. It is established that a poor cryolite product will result whenever the fluorine to aluminum weight ratio of the carbonate or feed liquor falls appreciably below 3.9, and also if there is insufficient carbonation. For example, if the fluorine to aluminum weight ratio of the carbonator feed drops to 3.6, the cryolite content of the product would be about 90% and the $NaF/AlF_3$ weight ratio will be as high as 1.9. Under more favorable conditions, the final calcined product will have a cryolite content of 95% and an $NaF/AlF_3$ weight ratio of 1.65 to 1.70, whereas the value of the weight ratio for pure cryolite is 1.5.

The precipitated cryolite product, even when produced under favorable conditions, is deficient in fluorine and high in sodium. This may be the result of incomplete replacement of the hydroxyl group in the aluminate ion by fluoride. This deficiency of fluorine in the cryolite product as precipitated is also characterized by the presence of $CO_2$, probably as carbonate. Although the optimum product contains only 0.5 to 1.0% $CO_2$, the $CO_2$ content increases quite rapidly with a decrease in the F/Al weight ratio of the liquor being carbonated. Also, the cryolite product may be contaminated with excessive amounts of silica, thereby making its use as an electrolyte for aluminum reduction furnaces undesirable.

Various objects and advantages of the instant invention will be apparent to one skilled in the art from the following discussion and disclosure.

It has now been discovered according to the instant invention that the quality of the cryolite product may be improved in cryolitic content and also in lower silica content by a beneficiation step involving reacting the precipitated cryolite product with fluoride ions which may be supplied by any soluble fluoride having cations which will not contaminate the cryolite product, such as sodium fluoride, sodium bi-fluoride, ammonium fluoride, ammonium bi-fluoride or hydrofluoric acid. Sodium fluoride is particularly satisfactory for the beneficiation because of its availability and because of lack of contamination in the cryolite product. The beneficiation may be performed on the cryolite product which has been dried. However, preferably, the beneficiation is accomplished by treating filter cake or the underflow from the carbonator thickener, which concentrates the slurry discharge from the carbonators. This treatment involves reacting the cryolitic solids in a beneficiation zone with a sodium fluoride solution having a fluorine content or fluoride ion concentration ranging from about 5 g./l. to saturation at the temperature of treatment. Preferably, a concentrated sodium fluoride solution, e.g., one having a fluorine content of about 15 g./l., is used. The reaction between the cryolitic solids and the sodium fluoride solution is carried out at a temperature in the range of about 70° C. to 95° C. for a period of time in the range of about ½ to 1½ hours (preferably 1 hour). The sodium fluoride liquor used for the reaction may be obtained from any source; however, its impurity content should not be excessive, particularly with respect to silica. Surprisingly, treatment with the sodium fluoride solution accomplishes an increase in the fluorine content, which increase cannot be accomplished by increase of fluorine in the carbonator feed liquor, and also reduces the alkalinity of the cryolitic solids along with release of substantially all of the $CO_2$ and some bound water.

The beneficiation step is satisfactorily accomplished with the cryolite thickener underflow containing about 30–60% solids. Preferably, the cryolite thickener underflow should contain about 50–60% solids.

The purpose of the beneficiation is to increase the fluorine content and decrease the alkalinity as indicated by the equivalent $NaF/AlF_3$ weight ratio. The lower the F/Al weight ratio in the carbonator feed extract the higher will be the equivalent $NaF/AlF_3$ weight ratio. Consequently, the beneficiation step is particularly advantageous when used on products from carbonator feed extracts of low F/Al weight ratio. An additional benefit of the beneficiation step is to lower the silica content in the cryolite product.

After beneficiation of the cryolite product the slurry is sent to another thickener. The underflow from the thickener is then processed by a filtering operation to obtain the cryolite product.

The invention will be readily ascertained by the following examples and the FIGURE which is a diagrammatic flow sheet of a typical embodiment; however, the examples and figure are not to be construed as limiting the invention thereto.

EXAMPLE 1

Three test samples (designated as A, B and C in Table I) of 130 g. of each of synthetic cryolite were added to solutions containing 123.5 g. of NaF and 6.5 g. of $NaHCO_3$ in 3.5 liters of water. The resulting slurries were stirred for 1 hour at temperatures indicated in Table I, below. The reacted solids were separated, washed, and dried. The improvement in quality is shown by the data given in Table I.

*Table I*

BENEFICIATION OF SYNTHETIC CRYOLITE BY TREATMENT WITH NaF SOLUTION

| Sample | Treating temp.°C. | Before treatment | | | | | | After treatment | | | | | |
|---|---|---|---|---|---|---|---|---|---|---|---|---|---|
| | | Weight ratios | | | | Weight percent cryolite [1] | Analysis, weight percent | Weight ratios | | | | Weight percent cryolite [1] from prod. analysis | Analysis, weight percent |
| | | F:Al | Na:F | Na:Al | NaF:AlF$_3$ | | | F:Al | Na:F | Na:Al | NaF:AlF$_3$ | | |
| A | 75 | 3.85 | 0.65 | 2.50 | 1.74 | 91 | F 49.5<br>Al 12.9<br>Na 32.2<br>CO$_2$ 1.3<br>H$_2$O 2.1 | 4.05 | 0.635 | 2.57 | 1.65 | 95.5 | F 51.8<br>Al 12.8<br>Na 32.9<br>CO$_2$ ----<br>H$_2$O 1.6 |
| B | 95 | 3.85 | 0.65 | 2.50 | 1.74 | 91 | F 49.5<br>Al 12.9<br>Na 32.2<br>CO$_2$ 1.3<br>H$_2$O 2.1 | 4.1 | 0.64 | 2.63 | 1.68 | 95.0 | F 51.6<br>Al 12.5<br>Na 33.0<br>CO$_2$ 0.17<br>H$_2$O ---- |
| C | 95 | 3.5 | 0.66 | 2.32 | 1.82 | 83.5 | F 45.4<br>Al 12.9<br>Na 30.0<br>CO$_2$ 2.4<br>H$_2$O 5.4 | 3.85 | 0.645 | 2.49 | 1.73 | 91.5 | F 49.7<br>Al 12.8<br>Na 32.0<br>CO$_2$ 0.20<br>H$_2$O ---- |

[1] Based on fluorine analysis.

EXAMPLE 2

Test samples of freshly precipitated cryolite containing about 0.6% Si, were treated with NaF solutions to demonstrate the effectiveness of Si removal by the practice of the invention. The cryolite samples were thickened slurries of about 50% solids in spent carbonation liquor. The thickened cryolite samples were treated with NaF solutions. In a typical experiment 120 g. of 50% cryolite slurry (54 g. dry cryolite) was mixed with 844 g. of 17.7 g. F/kg. NaF solution in a stainless steel container under reflux at 90° C. for one hour. The cryolite was then filtered, washed and dried at 110° C.

The details of the experiments and the results are given in Table II below where it can be seen that the reduction in the Si content is of the order of 65 to 75%. The amount of NaF solution used to treat the cryolite is expressed as the ratio of the fluoride in the NaF solution to the fluoride in the cryolite.

Table II

BENEFICIATION OF FRESHLY PRECIPITATED CRYOLITE

| Exp. No. | Temp.[1] °C. | pH NaF sol.[2] Initial | pH NaF sol.[2] Final | Ratio F in NaF solution to F in cryolite | Silicon balance | | | | | | | | Si out/in, percent |
|---|---|---|---|---|---|---|---|---|---|---|---|---|---|
| | | | | | Si in initial NaF sol. | | Si in thickened cryolite | | Si in final NaF sol. | | Si in final cryolite product | | |
| | | | | | Conc. g./kg. | Total g. | Percent Si | Total g. | Conc. g./kg. | Total g. | Percent Si | Total g. | |
| 1 | 70 | 8.5 | Unk. | 0.54 | 0.252 | 0.242 | 0.715 | 0.445 | 0.569 | 0.583 | 0.200 | 0.119 | 102 |
| 2 | 70 | [3]11.3 | Unk. | 0.54 | 0.256 | 0.248 | 0.715 | 0.445 | 0.557 | 0.572 | 0.234 | 0.139 | 103 |
| 3 | 90 | [3]12.0 | 10.9 | 1.00 | 0.185 | 0.178 | 0.523 | 0.159 | 0.329 | 0.336 | 0.138 | 0.042 | 112 |
| 4 | 90 | 8.7 | 9.6 | 1.00 | 0.178 | 0.171 | 0.523 | 0.159 | 0.380 | 0.382 | 0.175 | 0.053 | 115 |
| 5 | 90 | [3]12.1 | 11.1 | 0.58 | 0.270 | 0.259 | 0.598 | 0.337 | 0.494 | 0.510 | 0.127 | 0.071 | 97.5 |
| 6 | 90 | 8.6 | 9.7 | 0.58 | 0.270 | 0.259 | 0.598 | 0.337 | 0.487 | 0.485 | 0.210 | 0.117 | 101.0 |

[1] One hour beneficiation, at indicated temperature.
[2] With 17.7 g. F/kg. NaF solutions.
[3] To 960 g. of the NaF solution 4.8 g. 50% NaOH was added to raise the pH to this level.

NOTE.—Cryolite prepared by carbonation of a 4.1 F/Al weight ratio solution.

EXAMPLE 3

This example illustrates an embodiment for integrating the instant invention into a process for producing synthetic cryolite wherein the quality of the cryolite product is increased and the silica content decreased. The diagrammatic flow sheet is used in conjunction with the discussion.

Sodium fluoride solution, made from sodium silicofluoride, and an alkaline sodium aluminate solution, which may be derived as heretofore discussed, are adjusted by suitable process controls of the sodium fluoride and sodium aluminate flows to provide a continuous stream which is passed to the carbonator units, which has 52.00 parts fluorine, 13.00 parts aluminum, and 91 parts sodium per 4000 parts water, the fluorine to aluminum ratio being 4.00. (The quantities in the discussion of Example 3 are in parts by weight.) The stream continuously flows through a carbonation zone, which is preferably comprised of three carbonators. Gas for carbonation containing 10% $CO_2$ is fed to the second and third carbonators in the proportion 35/65 respectively and the off-gas from the number three carbonator is fed to number one. The temperature during carbonation is maintained at about 60° C. and the liquor retention time per carbonator is about 44 minutes. Precipitation of cryolite is complete after the stream has passed through the third carbonator and is then continuously passed to a first thickener. The overflow from the first thickener is carbonate liquor and may be used in a process for producing sodium fluoride. The thickener underflow, which is a thickened slurry of 60% solids containing the precipitated cryolite, contains 48.06 parts fluorine, 13.00 parts aluminum, 30.98 parts sodium, 0.48 part silicon, and 64 parts water, and is continuously fed to the beneficiator for upgrading the purity of the cryolite product. Sodium fluoride stream solution containing 43.04 parts of fluorine, 0.45 part silicon and 54.70 parts of sodium per 2562 parts of water is continuously fed to the beneficiator and is reacted with the underflow at 75° to 90° C. for about one hour. After treatment in the beneficiator the slurry stream is continuously passed to a second thickener and filter. Overflow from the thickener and filtrate from the filter are blended into one stream containing 37.80 parts fluorine, 53.03 parts sodium and 0.78 part silicon in 2734 parts water, and is continuously recycled to the silicofluoride reactor. Product filter cake contains 53.30 parts fluorine, 13.00 parts aluminum, 32.65 sodium, 0.15 part silicon, and 27 parts water and is calcined in a multiple-hearth furnace. Temperature of the calcination is about 700° C. The calcined product contains 0.5% or less water and is recovered in agglomerated form.

It will be understood that various changes, modifications and alterations may be made in the instant invention without departing from the spirit and scope thereof, and, as such, the invention is not to be limited except by the appended claims, wherein what is claimed is:

1. In a process for producing synthetic cryolite wherein a fluorine deficient cryolite product is precipitated by carbonation of an aqueous solution containing sodium aluminate and sodium fluoride and thereafter separated from a residual liquor, the improvement comprising the step of reacting the precipitated fluorine deficient cryolite product with a sodium fluoride solution having a fluoride ion concentration ranging from about 5 g./l. up to saturation at the temperature of treatment and wherein the reaction is carried out at a temperature in the range of about 70° C. to 95° C. for a period of time in the range of about ½ to 1½ hours.

2. A process according to claim 1 wherein the reaction is carried out for a period of time of about 1 hour.

3. In a process for producing synthetic cryolite wherein a fluorine deficient cryolite product is precipitated by carbonation of an aqueous solution containing sodium aluminate and sodium fluoride and thereafter separated from a residual liquor, the improvement comprising the step of reacting the precipitated fluorine deficient cryolite product with a sodium fluoride solution having a fluoride ion concentration of about 15 g./l. at a temperature in the range of about 70° C. to 95° C. for a period of about 1 hour.

4. In a process for producing synthetic cryolite wherein an aqueous solution containing sodium aluminate and sodium chloride is treated with a carbonating gas to form a cryolite precipitate which is separated from the residual liquor by a thickening operation and then filtering, the method of improving the quality of the cryolite product and ensuring that it has an F/Al ratio of at least about 3.9 comprising the steps of reacting the underflow from said thickening operation wherein sodium fluoride solution having a fluoride ion concentration ranging from about 5 g./l. up to saturation at the temperature of treatment is added and wherein the reaction is carried out at a temperature of about 70° C. to about 95° C. for a period of time in the range of about ½ to 1½ hours, subjecting the resulting slurry from the beneficiation zone to a second thickening operation and then filtering the underflow from the second thickening operation.

5. A process according to claim 4 wherein the reaction is carried out for a period of time of about 1 hour.

6. In a process for producing synthetic cryolite wherein an aqueous solution containing sodium aluminate and sodium chloride is treated with a carbonating gas to form a cryolite precipitate which is separated from the residual liquor by a thickening operation and then filtering, the method of improving the quality of the cryolite product and ensuring that it has an F/Al ratio of at least about 3.9 comprising the steps of treating the underflow from the said thickening operation in a beneficiation zone wherein sodium fluoride solution having a fluoride ion concentration of about 15 grams per liter is added and wherein the reaction is carried out at a temperature in the range of about 70° C. to 95° C. for a period of about 1 hour, subjecting the resulting slurry from the beneficiation zone to a second thickening operation and then filtering the underflow from the second thickening operation.

References Cited in the file of this patent
UNITED STATES PATENTS

| | | |
|---|---|---|
| 2,196,077 | Morrow et al. | Apr. 2, 1940 |
| 2,714,053 | Albert et al. | July 26, 1955 |